United States Patent
Miyazawa et al.

(10) Patent No.: US 7,303,288 B2
(45) Date of Patent: Dec. 4, 2007

(54) IMAGE DISPLAY DEVICE

(75) Inventors: Yasunaga Miyazawa, Okaya (JP); Takashi Takeda, Suwa (JP); Yoshitaka Ito, Matsumoto (JP); Hideki Kojima, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 184 days.

(21) Appl. No.: 11/246,365

(22) Filed: Oct. 11, 2005

(65) Prior Publication Data

US 2006/0114422 A1 Jun. 1, 2006

(30) Foreign Application Priority Data

Nov. 26, 2004 (JP) ............................. 2004-341595

(51) Int. Cl.
*G03B 21/26* (2006.01)
*G03B 21/20* (2006.01)
*G02F 1/1335* (2006.01)
*H04N 5/74* (2006.01)
*H04N 5/70* (2006.01)
*G02B 5/02* (2006.01)
*G02B 27/00* (2006.01)
*G02B 6/00* (2006.01)
*F21V 7/04* (2006.01)

(52) U.S. Cl. ............... 353/94; 353/29; 353/30; 353/85; 353/102; 348/750; 348/758; 348/801; 359/599; 359/618; 362/612; 362/555; 362/561; 362/246; 362/800; 385/133

(58) Field of Classification Search .............. 353/94, 353/29, 30, 31, 34, 37, 82, 98, 99, 102, 122, 353/85, 97; 348/739, 742, 744, 750, 758, 348/759, 801; 349/5, 7, 8, 64, 65; 359/618, 359/619, 623, 599; 362/612, 551, 555, 561, 362/227, 231, 235, 246, 251, 800, 558; 385/33, 385/133, 901, 34

See application file for complete search history.

(56) References Cited

FOREIGN PATENT DOCUMENTS

| JP | A-09-325715 | 12/1997 |
|---|---|---|
| JP | A-11-202286 | 7/1999 |
| JP | A-2001-235720 | 8/2001 |
| JP | A-2002-006815 | 1/2002 |
| JP | A-2002-040390 | 2/2002 |
| JP | A-2004-004463 | 1/2004 |
| JP | A-2004-325576 | 11/2004 |
| JP | A-2004-325577 | 11/2004 |
| JP | A-2004-326071 | 11/2004 |
| JP | A-2004-326101 | 11/2004 |
| JP | A-2004-361939 | 12/2004 |
| JP | A-2005-025177 | 1/2005 |

*Primary Examiner*—Rochelle Blackman

(74) *Attorney, Agent, or Firm*—Oliff & Berridge, PLC

(57) ABSTRACT

Aspects of the invention can provide an image display device that can include light sources provided, respectively, for regions obtained by dividing an image forming region of an electro-optic modulator into plural regions to irradiate corresponding regions, and a light source control portion that performs lighting control on the light sources. The light source control portion can perform the lighting control on the light sources for the respective region independently in sync with writing of image data to the electro-optic modulator, and the lighting control can be performed in such a manner that the light source corresponding to at least one region among the plural regions is kept unlit in a writing period for a screenful of image data.

20 Claims, 7 Drawing Sheets

IMAGE DISPLAY DEVICE

This application claims the benefit Japanese Patent Application No. 2004-341595 filed Nov. 26, 2004. The entire disclosure of the prior application is hereby incorporated by reference herein in its entirety.

BACKGROUND

Aspects of the invention can relate to an image display device using an electro-optic modulator.

A moving image can be displayed on a related art image display device using an electro-optic modulator having a hold-type display mode, such as a liquid crystal display panel (liquid crystal device), as a blurred tailed-image due to the characteristic of an electro-optic modulator of this type. This is a phenomenon that does not occur in a CRT (Cathode Ray Tube) display that outputs an image impulsively.

In order to prevent a display of such a blurred tailed-image, the related art device needs to be controlled so that it outputs an image impulsively in the same way as the CRT. For example, as are disclosed in cited documents specified below, there are methods by which lights to illuminate the electro-optic modulator (hereinafter, descriptions will be given using the liquid crystal display as an example) are irradiated to the surface of the liquid crystal device intermittently, and a method by which the liquid crystal display can be divided into plural regions along a scanning line in the horizontal direction and lights are scrolled region by region.

According to JP-A-9-325715, control can be performed in such a manner that lights from the light source are irradiated to the surface of the liquid crystal display for only a limited time within one field period. This can be regarded as the method by which lights from the light source are irradiated to the liquid crystal device intermittently. Specifically, according to the above technique, a shutter can be provided on an optical path from the light source lamp to the viewer by way of the liquid crystal device, and by controlling the numerical aperture of the shutter (a ratio of a time during which lights are allowed to pass through with respect to one field period), an image is controlled to be displayed to the viewer for only a limited time in each field. Herein, a measure to prevent a display of a blurred tailed-image is taken by controlling the shutter in this manner. Also, by setting the limited time for keeping the shutter open in the latter half of one field period, the display can be started when a response of the liquid crystal display has achieved a stable state.

On the other hand, the other four cited documents specified below can be regarded as the method by which band-like lights are scrolled on the surface of the liquid crystal display in the vertical direction. In particular, according to JP-A-2004-4463, a lens array wheel that causes lights from the light source to undergo cyclical deflection is provided, so that lights are scrolled cyclically on the liquid crystal device by means of the lens array wheel. In this document, too, by taking a slow response of the liquid crystal device into account, control is performed in such a manner that lighting timing of a block of interest is delayed by a specific time from the writing to this block. This document also discloses, as another embodiment, a method by which a scroll disc having a partial spiral transparent portion is provided instead of the lens array wheel, so that lights having passed through the spiral light-transmitting portion are scrolled on the liquid crystal device in association with rotations of the scroll disc.

According to JP-A-2001-235720, JP-A-2002-6815, and JP-A-11-202286, a discharge lamp, such as a fluorescent light tube, is provided for each of plural regions in the vertical direction of the liquid crystal device, and the respective discharge lamps are lit in sync with the writing timing to the liquid crystal device, thereby preventing a display of a blurred tailed-image. In these documents, too, by taking a slow response of the liquid crystal device into account, for a discharge lamp corresponding to a region in which image data is being written, lighting timing is delayed by a specific time from the writing to this region.

Meanwhile, luminance becomes insufficient when the techniques disclosed in the first through fifth cited documents, that is, the method by which lights to illuminate the liquid crystal display are irradiated intermittently to the surface of the liquid crystal device, and the method by which lights are scrolled on the liquid crystal device region by region, are adopted to control the device to output an image impulsively for preventing a display of a blurred tailed-image as described. This poses a problem that dynamism of a moving image is lost as contrast is reduced. This problem may be solved by increasing luminance of the backlight. However, when luminance of the backlight is increased, there arises another problem that the entire screen becomes whitish for an image of a scene where original luminance is low.

To solve this problem, for example, JP-A-2002-40390 discloses a technique by which the luminance level of a video signal is detected, and adaptive light modulation processing (lighting control on solid-state light sources and control of pixel values) is performed region by region depending on the detected maximum luminance level. Hence, in the case of a video having a high maximum luminance level, that is, a bright video, luminance is set high by extending an image display period. Conversely, in the case of a video having a low maximum luminance level, that is, a dark video, a less-blurred, sharp moving image is displayed by shortening the image display period.

The effect of preventing a display of a blurred tailed-image can be expected to a certain degree with any of the techniques disclosed above.

However, the first document has a problem as follows. That is, because lights from the light source are irradiated to the entire surface of the liquid crystal device for only a limited time by means of the shutter, and a time for keeping the shutter open is set to a specific time (for example, ½ or ¼ of one field) in the latter half of one field period, image data for one field period has to be written before the shutter opens, which means the image data has to be written at a high speed. In addition, because the shutter employing liquid crystal, such as polymer dispersed liquid crystal and ferroelectric liquid crystal, is used, a closing-opening response raises another problem.

Problems with the second document are as follows. That is, because the scroll irradiation is performed, it is necessary to provide a mechanism to rotate the lens array wheel or the scroll disc. This technique also needs rotation control at high accuracy to scroll lights on the liquid crystal device exactly at predetermined timing.

Problems with the third through fifth documents are as follows. That is, because a discharge lamp, such as a fluorescent light tube, is used as the backlight of the liquid crystal device, lighting ON/OFF operations cannot be performed instantaneously. Hence, fine-tuned lighting control cannot be performed, and it is difficult to perform lighting ON/OFF operations at highly accurate timing. Moreover, the discharge lamp has irregularities in luminance and color at start-up of lighting.

Meanwhile, as has been described, the sixth document performs adaptive light modulation processing, and the effect of playing back a less-blurred sharp moving image can be expected to a certain degree.

However, in order to improve the image quality of the image display device using the liquid crystal device, there are still many problems that cannot be solved by the techniques disclosed in the first through sixth documents. For example, when the liquid crystal device is illuminated region by region as described above, it is necessary to further enhance homogeneity of brightness across all the regions (the entire one screen) as well as homogeneity of brightness within each region.

In order to further enhance homogeneity of brightness across all the regions (the entire one screen) as well as homogeneity of brightness within each region, a technique of providing a diffusing plate or a rod integrator has been proposed in various manners. However, homogeneity of brightness across all the regions (the entire one screen) as well as homogeneity of brightness within each region cannot be enhanced satisfactorily by merely providing the diffusing plate or the rod integrator, and the need for further improvements has been increasing.

SUMMARY

An aspect of the invention can be to provide an image display device that enables instantaneous lighting ON/OFF operations and illumination with fewer irregularities in luminance and color at start-up of lighting, and is capable of not only preventing or reducing a display of a blurred tailed-image, but also enhancing homogeneity of brightness across all the regions (the entire one screen) as well as homogeneity of brightness within each region.

An image display device according to an aspect of the invention can include light sources provided, respectively, for regions obtained by dividing an image forming region of an electro-optic modulator into plural regions to irradiate corresponding regions, and a light source control portion that can perform lighting control on the light sources. The light source control portion performs the lighting control on the light sources for the respective regions independently in sync with writing of image data to the electro-optic modulator, and the lighting control can be performed in such a manner that the light source corresponding to at least one region among the plural regions is kept unlit in a writing period for a screenful of image data.

Because the light sources are provided to correspond to the respective regions of the panel surface of the electro-optic modulator, and the lighting control is performed in such a manner that, of the light sources corresponding to the respective regions, the light source corresponding to at least one region among the plural regions is kept unlit in the writing period of a screenful image data. This eliminates or reduces an event that a display state of a given screen (one frame) is carried over to the following frame. It is thus possible to suppress a display of a blurred tailed-image.

It is preferable that the light sources are solid-state light sources.

By using the solid-state light sources as the light sources, not only can instantaneous lighting ON/OFF operations be achieved, but also illumination with fewer irregularities in luminance and color can be achieved at start-up of lighting. When the instantaneous lighting ON/OFF operations are enabled, so is the lighting control at arbitrary timing and high accuracy. Fine-tuned lighting control at high accuracy can be therefore achieved. It can be preferable that the lighting control, performed in such a manner that the light source corresponding to at least one region among the plural regions is kept unlit, is lighting control under which the light sources for the respective regions are kept lit in turn for a specific time. When configured in this manner, plural regions that together form one screen are irradiated successively by the corresponding solid-state light sources, that is, scroll irradiation is performed. It is thus possible to suppress a display of a blurred tailed-image more effectively.

It can be preferable that the lighting control, performed in such a manner that the solid-state light source corresponding to at least one region among the plural regions is kept unlit, is lighting control under which, for a region in which the image data is being written, the light source corresponding to the region is lit with a specific time of delay from image data writing timing of the region. When configured in this manner, in a case where a liquid crystal device is used as the electro-optic modulator, it is possible to start to illuminate the region of interest when a response of the liquid crystal device achieves a sufficiently stable state. It is thus possible to perform the lighting control by taking a delay in response of the liquid crystal device into account, which enables a high-quality image to be displayed.

It is preferable that the light source control portion performs the lighting control on the light sources for the respective regions to enhance homogeneity of illuminance across all the regions. When configured in this manner, it is possible to enhance homogeneity of illuminance across the entire one screen, which can in turn make the boundaries of the respective regions less noticeable. This lighting control can be achieved by applying the lighting time control (including pulse width modulation) for controlling a lighting time or the voltage control to the light sources for the respective regions.

It is preferable that the lighting control performed to enhance homogeneity of illuminance across all the regions is lighting control under which illuminance of other regions is matched with illuminance of a region having lower illuminance. When configured in this manner, it is possible to enhance homogeneity of illuminance across the entire one screen.

It is preferable that when the light source for each region can include more than one light source, the light source control portion performs the lighting control on more than one light source to enhance homogeneity of illuminance within each region. When configured in this manner, it is possible to enhance homogeneity of illuminance within the respective regions individually. This lighting control can be achieved, as has been described, by applying the lighting time control (including pulse width modulation) for controlling a lighting time or the voltage control to the plural light sources for each region.

It is preferable that the lighting control performed to enhance homogeneity of illuminance within each region is lighting control under which illuminance of other portions is matched with illuminance of a portion having lower illuminance within each region. When configured in this manner, it is possible to enhance homogeneity of illuminance within respective regions individually.

It is preferable that the image display device further includes a diffusing plate provided between the light source for each region of the electro-optic light modulator and the region. By providing the diffusing plate in this manner, it is possible to irradiate lights from the light source to the corresponding region of the liquid crystal device with high homogeneity. In addition, because a dimension in the depth direction of the diffusing plate is small, this configuration is advantageous in reducing the overall image display device in size.

It is preferable that the diffusing plate provided for each region has a diffusing capability such that lights from the light source are diffused at different degrees on a surface thereof. By using the diffusing plate having the diffusing capability as described above, it is possible to enhance homogeneity of illuminance more effectively, which can in turn suppress illumination irregularities within each region to the least possible level.

It is preferable that the diffusing capability is a diffusing capability such that lights from the light source are diffused more at and in the vicinity of a center than on and in the vicinity of an edge of the region. By using the diffusing plate having the diffusing capability as described above, it is possible to enhance homogeneity of illuminance more effectively, which can in turn suppress illumination irregularities within each region to the least possible level.

It is preferable that the image display device further can include a light shielding plate provided between the diffusing plate provided for each region and the light source for the region, so that lights from the solid-state light sources corresponding to the other regions are shielded. When configured in this manner, it is possible to irradiate lights from the solid-state light sources for the respective regions to the corresponding regions effectively.

It is preferable that the image display device further can include a rod integrator provided between the light source for each region of the electro-optic modulator and the region. By providing the rod integrator as described above, it is possible to enhance homogeneity of illuminance within the respective regions, which can in turn suppress illumination irregularities within the respective regions to the least possible level.

It is preferable that the rod integrator for each region is formed of plural rod integrators aligned in line in the corresponding region. By forming the rod integrator from plural rod integrators aligned in line within the corresponding region, it is possible to further enhance homogeneity of illuminance within the respective regions, which can in turn suppress illumination irregularities within the respective regions to the least possible level.

It is preferable that each of the plural rod integrators has one of a square cross section and a cross section of a shape close to a square. When configured in this manner, it is possible to further enhance homogeneity of illuminance, which can in turn suppress illumination irregularities within the respective regions to the least possible level.

The image display device may further include an image data display control portion that is capable of controlling pixel values of the image data, so that the image data display control portion performs control of the pixel values in such a manner that a difference between illuminance on and in the vicinity of a boundary of each region and illuminance at and in the vicinity of a center of the region can be lessened. By controlling the pixel values within each region in this manner, it is also possible to enhance homogeneity of illuminance within the region.

BRIEF DESCRIPTION OF THE DRAWINGS

The invention will be described with reference to the accompanying drawings, wherein like numbers reference like elements, and wherein.

DETAILED DESCRIPTION OF EMBODIMENTS

Hereinafter, exemplary embodiments of the invention will be described. In the embodiments described below, a projector will be described as an example of an image display device using an electro-optic modulator having a hold-type display mode on the assumption that the electro-optic modulator is a liquid crystal device. Also, for ease of description, a liquid crystal device in a single-plate projector will be described as an example in the exemplary embodiments below.

Figure 1A:
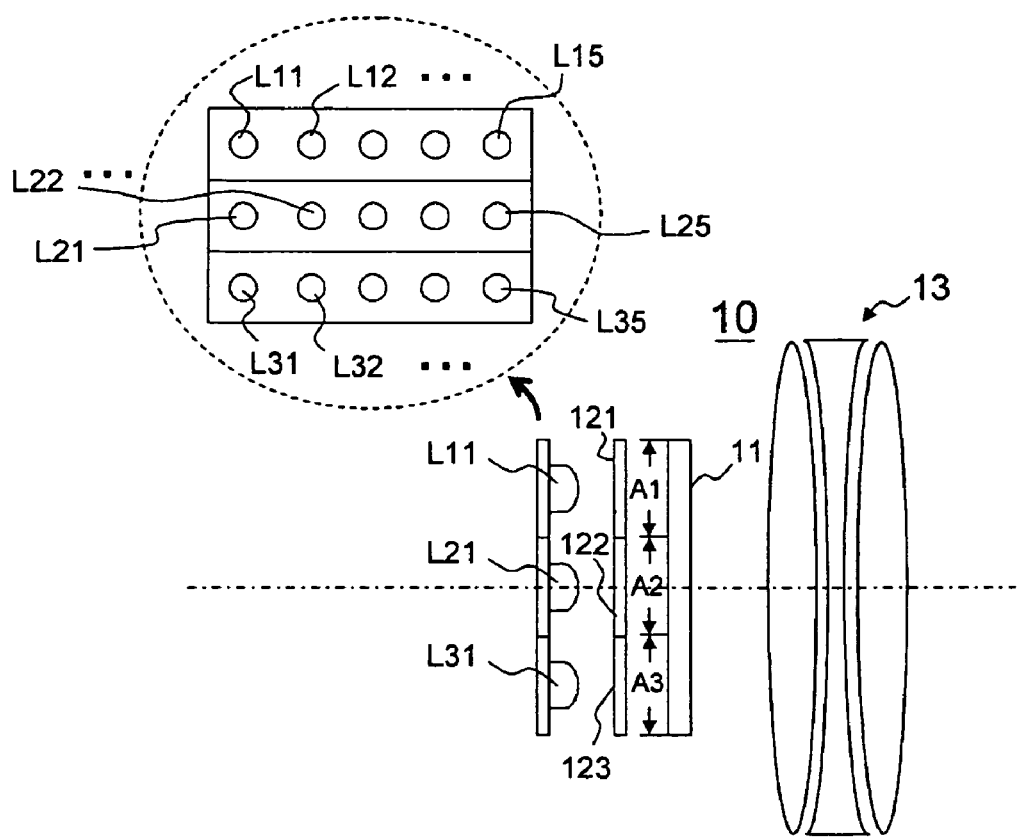
FIGS. 1A and 1B are views schematically showing an optical system in a projector according to a first exemplary embodiment of the invention.
Figure 1B:
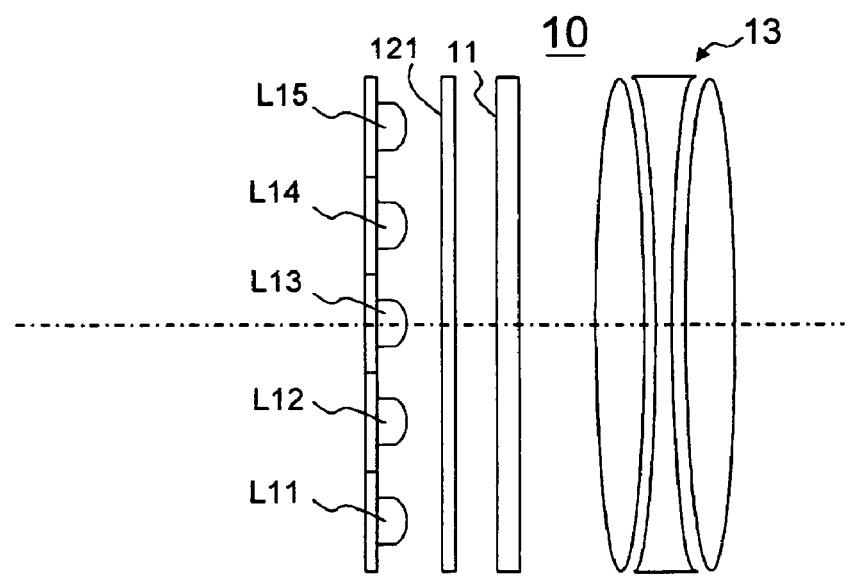

FIGS. 1A and 1B are views schematically showing an optical system in a projector according to a first exemplary embodiment of the invention. FIG. 1A is a side view and FIG. 1B is a plan view. Components that need not be described in the first exemplary embodiment are omitted from these drawings.

A projector 10 of the first exemplary embodiment can include a liquid crystal device 11 used as an electro-optic modulator, plural light sources (solid-state light sources, such as light emitting diodes (LEDs)) (as is shown in an inset within a dotted line frame of FIG. 1A, three are aligned in the vertical direction and five are aligned in the horizontal direction in the first embodiment) L11 through L15, L21 through L25, and L31 through L35 that play a role of a backlight of the liquid crystal device 11, diffusing plates 121, 122, and 123 that are provided between these solid-state light sources L11 through L15, L21 through L25, and L31 through L35 and the liquid crystal device 11, and a projection lens 13 provided on the light exiting side of the liquid crystal device 11.

The panel surface used as the image forming surface of the liquid crystal device 11 can be divided to three regions A1, A2, and A3 along a scanning line in the horizontal direction, and the solid-state light sources L11 through L15, L21 through L25, and L31 through L35 are provided to illuminate these regions A1, A2, and A3, respectively. To be more specific, the solid-state light sources L11 through L15 are provided to correspond to the region A1 of the liquid crystal device 11. Also, the solid-state light sources L21 through L25 are provided to correspond to the region A2 of the liquid crystal device 11. Further, the solid-state light sources L31 through L35 are provided to correspond to the region A3 of the liquid crystal device 11.

Also, the diffusing plate 121 can be interposed between the solid-state light sources L11 through L15 and the region A1 of the liquid crystal device 11. The diffusing plate 122 is interposed between the solid-state light sources L21 through L25 and the region A2 of the liquid crystal device 11. The diffusing plate 123 is interposed between the solid-state light sources L31 through L35 and the region A3 of the liquid crystal device 11.

These diffusing plates 121, 122, and 123 provided, respectively, for the regions A1, A2, and A3 of the liquid crystal device 11 are furnished with the functions of enhancing homogeneity of illuminance within their corresponding regions.

Figure 2:
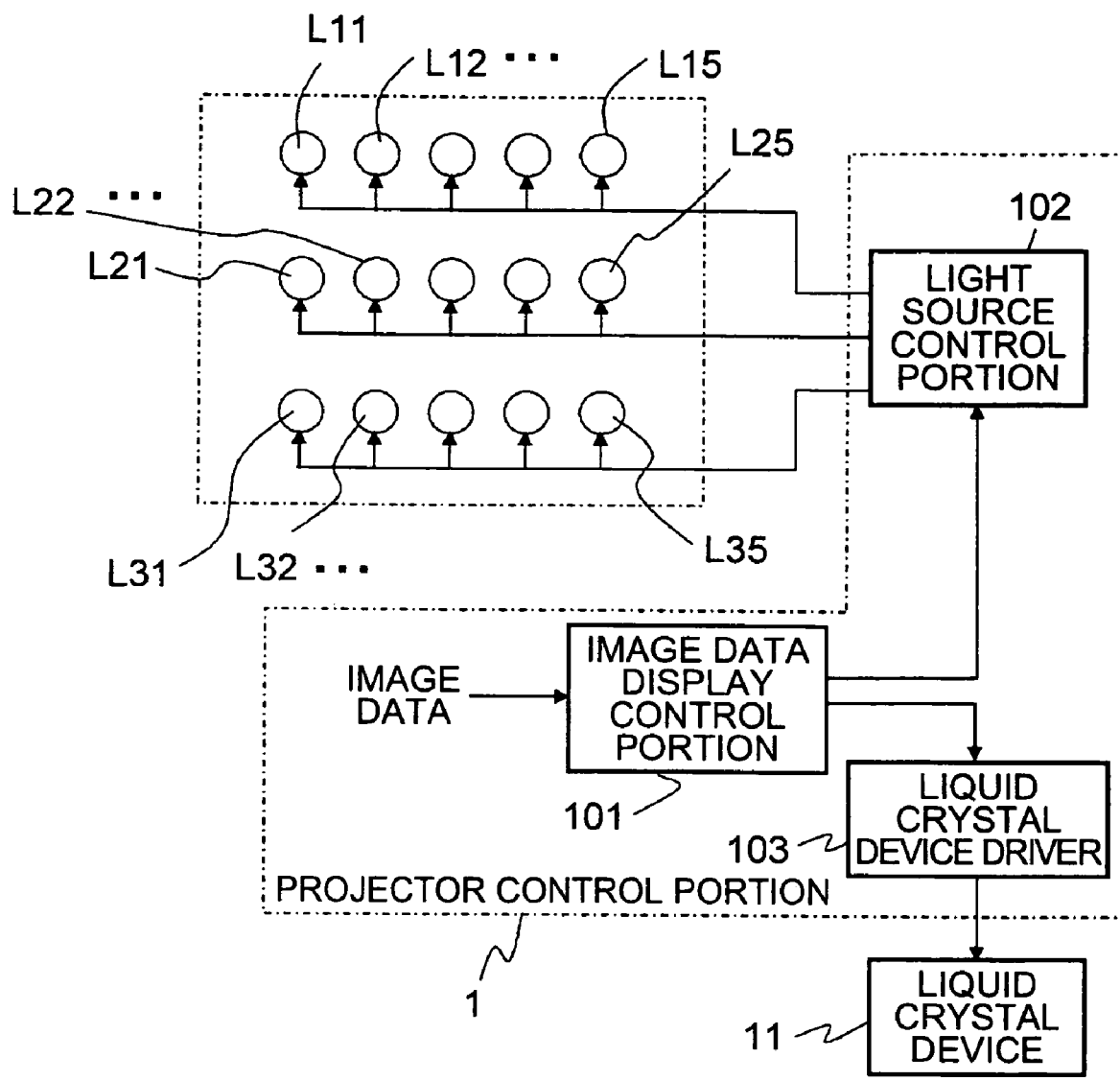
FIG. 2 is a block diagram schematically showing a projector control portion that controls the projector shown in FIGS. 1A and 1B.

FIG. 2 is a block diagram schematically showing an exemplary control portion that controls the projector 10 shown in FIGS. 1A and 1B (hereinafter, referred to as the projector control portion 1). The projector control portion 1 includes an image data display control portion 101 furnished with an image data processing function of processing image data to be projected and a light source control information generating function of generating light source control information for performing lighting control on the solid-state light sources L11 through L15, L21 through L25, and L31 through L35, a light source control portion 102 that performs lighting control on the solid-state light sources L11 through L15, L21 through L25, and L31 through L35 according to the light source control information generated in the image data display control portion 101, and a liquid crystal device driver 103 that performs processing to write the image data processed in the image data display control portion 101 into the liquid crystal device 11 at predetermined timing.

The lighting control on the solid-state light sources L11 through L15, L21 through L25, and L31 through L35 will now be described. As has been described, the solid-state light sources L11 through L15, L21 through L25, and L31 through L35 irradiate the corresponding regions A1, A2, and A3 of the liquid crystal device 11. Herein, lighting control is performed in such a manner that the solid-state light sources L11 through L15, L21 through L25, and L31 through L35 are kept lit for a specific time in each frame in sync with the writing of image data. The light source control portion 102 performs this lighting control according to the light source control information generated in the image data display control portion 101.

For a region in which the image data is being written, the lighting control is performed in such a manner that the solid-state light sources corresponding to this region are lit with a specific time of delay from the writing timing of the image data of this region. This lighting control takes into account that a response of a display of the liquid crystal device to the image data writing is slow.

Figure 3:
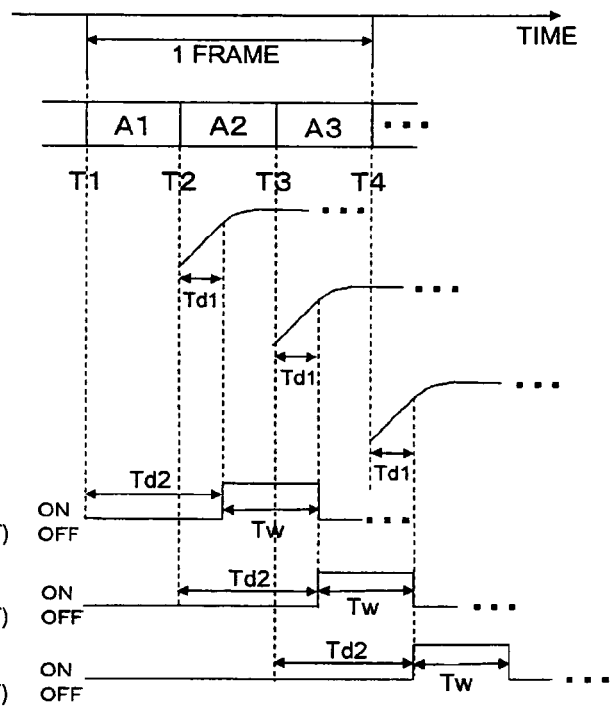
FIG. 3 is a time charts used to describe the lighting control on solid-state light sources.

FIG. 3 is a time charts used to describe the lighting control on the solid-state light sources L11 through L15, L21 through L25, and L31 through L35.

In FIG. 3, (a) shows the writing to the regions A1, A2, and A3 within a given frame. T1 indicates a time point at which writing to the region A1 starts, and T2 indicates a time point at which writing to the region A1 ends. At the time point T2, after the writing to the region A1 ends, writing to the following region A2 starts. For ease of description, descriptions will be given on the assumption that writing to the following region starts at the same time point at which writing to a given region ends. Hence, in this case, the time point T2 is the time point at which the writing to the region A1 ends and the writing to the region A2 starts. Also, T3 indicates a time point at which writing to the region A2 ends. T3 also indicates a time point at which the writing to the region A3 starts. Also, T4 indicates a time point at which writing to the region A3 ends.

In FIG. 3, (b) to (d) show responses of liquid crystal in each region at the time points T2, T3, and T4 at which writing to the respective regions A1, A2, and A3 ends. To be more specific, they show responses of liquid crystal to the scanning lines at the lowermost ends in the respective regions A1, A2, and A3 after writing for the scanning lines at the lowermost ends is performed.

For example, (b) in FIG. 3 shows a response of liquid crystal of the region A1 from the time point T2 at which writing to the region A1 ends. As can be understood from (b) in FIG. 3, liquid crystal on the scanning line at the lowermost end of the region A1 achieves an almost stable response state after a specific time Td1 from the time point T2 at which the writing to the region A1 ends, that is, the time point T2 at which the writing for the scanning line at the lowermost end of the region A1 ends. Herein, the timing at which the liquid crystal on the scanning line at the lowermost end of the region A1 achieves an almost stable response state is defined as the timing at which liquid crystal for the entire region A1 achieves an almost stable response state.

It is thus preferable to perform the lighting control in such a manner that the solid-state light sources L11 through L15 corresponding to the region A1 are lit at this timing. Considering this by setting the base point to the start of the writing to the region A1, then, as is shown in (e) in FIG. 3, it is sufficient to light the solid-state light sources L11 through L15 after the elapse of a time (referred to as Td2), which is a time from the time point T1 at which the writing to the region A1 starts to the timing at which liquid crystal of the entire region A1 achieves an almost stable response state.

The lighting control on the solid-state light sources L21 through L25 corresponding to the region A2 is performed in the same manner as above. To be more specific, as is shown in (c) in FIG. 3, because liquid crystal for the entire region A2 achieves an almost stable response state after the specific time Td1 has elapsed since the time point T3 at which the writing to the region A2 ends, as is shown in (f) in FIG. 3, the lighting control is performed in such a manner that the solid-state light sources L21 through L25 are lit after the time Td2 needed for the liquid crystal for the entire region A2 to achieve an almost stable response state has elapsed since the time point T2 at which the writing to the region A2 started. Also, the lighting control on the solid-state light sources L31 through L35 corresponding to the region A3 is performed in the same manner as above (see FIG. 3, (d) and (g)).

Assume that lighting times (referred to as Tw) of the solid-state light sources L11 through L15, L21 through L25, and L31 through L35 corresponding, respectively, to the regions A1, A2, and A3 continue until the solid-state light sources corresponding to the following region are lit. Hence, as are shown in (e) through (g) in FIG. 3, the solid-state light sources L11 through L15, L21 through L25, and L31 through L35 corresponding, respectively, to the regions A1, A2, and A3 are kept lit in turn for the predetermined time.

By performing the lighting control as is shown in (a) through (g) in FIG. 3 on the solid-state light sources L11 through L15, L21 through L25, and L31 through L35 corresponding, respectively, to the regions A1, A2, and A3, impulsive display control is enabled in the same way as the CRT. It is thus possible to prevent a display of a blurred tailed-image, which is intrinsic to the liquid crystal device having a hold-type display mode.

Although the solid-state light sources L11 through L15, L21 through L25, and L31 through L35 corresponding, respectively, to the regions A1, A2, and A3 are kept lit in turn for the predetermined time, the viewer sees a state in which brightness is integrated. Hence, to the viewer, it seems as if the entire one frame (regions A1, A2, and A3) were lit.

When the lighting control is performed, or a region into which image data is being written, the lighting control can be performed in such a manner that the solid-state light sources corresponding to this region are lit with a predetermined time of delay from the writing timing of the image data of this region. To be more specific, the lighting control is performed in such a manner that the solid-state light sources corresponding to this region are lit at timing delayed by the specific time Td2 from the start of the writing. It is thus possible to light the solid-state light sources at the time point at which the liquid crystal device achieves a stable state. Also, by performing the lighting control in this manner, a high-quality image can be displayed.

Also, in the first exemplary embodiment, the diffusing plates 121, 122, and 123 are provided to correspond to the solid-state light sources L11 through L15, L21 through L25, and L31 through L35, respectively. It is thus possible to enhance homogeneity of illuminance within the respective regions A1, A2, and A3 of the liquid crystal device 11.

In addition, by using the solid-state light sources L11 through L15, L21 through L25, and L31 through L35 as the light sources, not only can instantaneous lighting ON/OFF operations be achieved, but also illumination with fewer irregularities in luminance and color can be achieved. When instantaneous lighting ON/OFF operations are enabled, so is the lighting control at arbitrary timing and high accuracy. Hence, the fine-tuned lighting control as is shown in (a) through (g) in FIG. 3 can be readily achieved.

In order to achieve more homogeneous illuminance across all the regions A1, A2, and A3, that is, the illuminance across the entire one screen, and to achieve more homogeneous illuminance within the respective regions A1, A2, and A3, the projector 10 of the first exemplary embodiment takes measures as set forth in (A) through (C) below.

(A) For the solid-state light sources L11 through L15, L21 through L25, and L31 through L35 corresponding, respectively, to the regions A1, A2, and A3, the lighting control to further enhance homogeneity of illuminance across all the regions is performed.

According to this lighting control, the light source control can be performed according to the light source control information generated in the image data display control portion 101 by the light source control information generating function. The light source control in this case is as follows. That is, for example, the lighting control is performed in such a manner that, voltage control and lighting time control (including pulse width modulation) are performed on the solid-state light sources L11 through L15, L21 through L25, and L31 through L35 corresponding, respectively, to the regions A1, A2, and A3 on a region-by-region basis. In this instance, of the regions A1, A2, and A3, the one having the lowest illuminance is used as the reference, and the lighting control is performs in such a manner that the illuminance of the other regions is matched with the illuminance of the region having the lowest illuminance.

By performing the light source control in this manner, it can be possible to further enhance homogeneity of illuminance across all the regions of the liquid crystal device When the lighting control is performed independently on the solid-state light sources L11 through L15, L21 through L25, and L31 through L35 corresponding, respectively, to the regions A1, A2, and A3, it is possible to perform the lighting control on the individual solid-state light sources L11 through L15, L21 through L25, and L31 through L35 corresponding, respectively, to the regions A, A2, and A3, so that homogeneity of luminance within the respective regions A1, A2, and A3 is further enhanced.

For example, in the case of the region A1 for which five solid-state light sources L11 through L15 are provided, by performing the lighting control on these five solid-state light sources L11 through L15 individually (such as the voltage control and the lighting time control as mentioned above), it is possible to further enhance homogeneity of illuminance within the region A1.

By performing the lighting control in this manner for the respective regions A1, A2, and A3 independently in this manner, it is possible to enhance homogeneity of illuminance within the respective regions A1, A2, and A3, which can in turn make illuminance across all the regions more homogeneous. In this case, the lighting control performed to enhance homogeneity of illuminance within the respective regions A1, A2, and A3 is the lighting control under which illuminance of other portions is matched with the illuminance of a portion having lower illuminance within each region.

(B) Each of the diffusing plates 121, 122, and 123 is a diffusing plate with the diffusing capability such that can lessen illuminance irregularities between illuminance at and in the vicinity of the center and illuminance on and in the vicinity of the edges of each of the regions A, A2, and A3.

To this end, each of the diffusing plates 121, 122, and 123 provided, respectively, to the regions A1, A2, and A3 is a diffusing plate having a plane on which lights are diffused at different degrees. To be more specific, in a case where the solid-state light sources L11 through L15, L21 through L25, and L31 through L35 corresponding, respectively, to the regions A1, A2, and A3 are arrayed as are shown in the inset of FIG. 1A, in the regions A1, A2, and A3 of the liquid crystal device 11, the illuminance at and in the vicinity of the center along the central axis of the corresponding diffusing plates 121, 122, and 123 in the horizontal direction is normally higher than the illuminance on and in the vicinity of the edges of the corresponding diffusing plates 121, 122, and 123. Hence, to lessen the difference in illuminance between the center and the edges, a diffusing plate having a diffusing capability of diffusing lights more at and in the vicinity of the center than on and in the vicinity of the edges, is used as each of the diffusing plates 121, 122, and 123.

Figure 4:
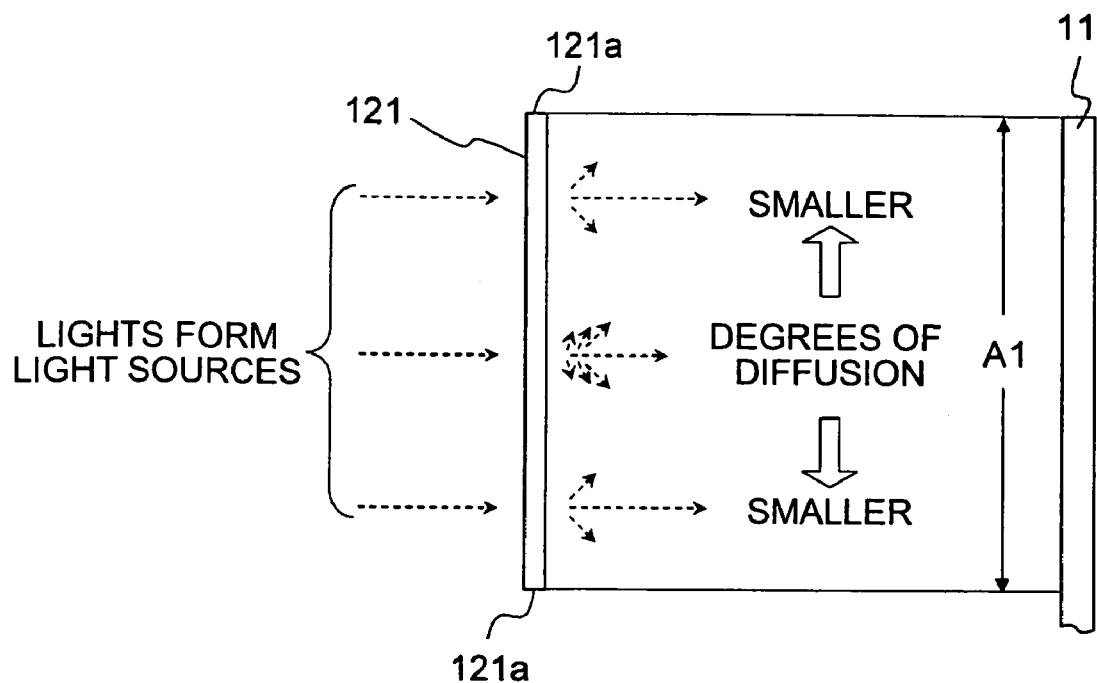
FIG. 4 is a view used to describe the diffusing capability of a diffusing plate used in the first exemplary embodiment.

FIG. 4 is a view used to describe the diffusing capability of the diffusing plate (FIG. 4 shows the diffusing plate 121) used in the first exemplary embodiment. FIG. 4 is also an enlarged view of the diffusing plate 121 and the region A1 of the liquid crystal device 11 of FIGS. 1A and 1B. As can be understood from FIG. 4, the diffusing plate 121 has the diffusing capability of diffusing lights more at and in the vicinity of the center than on and in the vicinity of the edges 121a.

By using the diffusing plates 121, 122, and 123 having the diffusing capability as described above, it is possible to further enhance homogeneity of illuminance within the respective regions A1, A2, and A3 of the liquid crystal device 11.

(C) The image data display control portion 101 controls the pixel values of the pixels within the respective regions A1, A2, and A3 by the image data processing function. By controlling the pixel values of the pixels within each region in this manner, it is possible to further enhance homogeneity of illuminance within each region.

Processing in (A) through (C) above can achieve a certain effect when used solely, and a larger effect can be expected when used in combination. By adopting (A) through (C) above, not only is it possible to enhance homogeneity of illuminance within the respective regions A1, A2, and A3, but it is also possible to further enhance homogeneity of illuminance across the entire one screen.

It is possible to perform at least one of (A) through (C) above together with the adaptive light modulation processing (lighting control on the solid-state light sources and control of the pixel value through the image processing) by which the luminance level is matched with the maximum luminance level in each region. In the case of a moving image, the adaptive light modulation processing is performed frame by frame or for every certain number of consecutive frames.

In the first exemplary embodiment, light shielding plates may be provided between the solid-state light sources L11 through L15, L21 through L25, and L31 through L35 and the diffusing plates 121, 122, and 123 to shield lights from the solid-state light sources corresponding to other regions.

Figure 5:
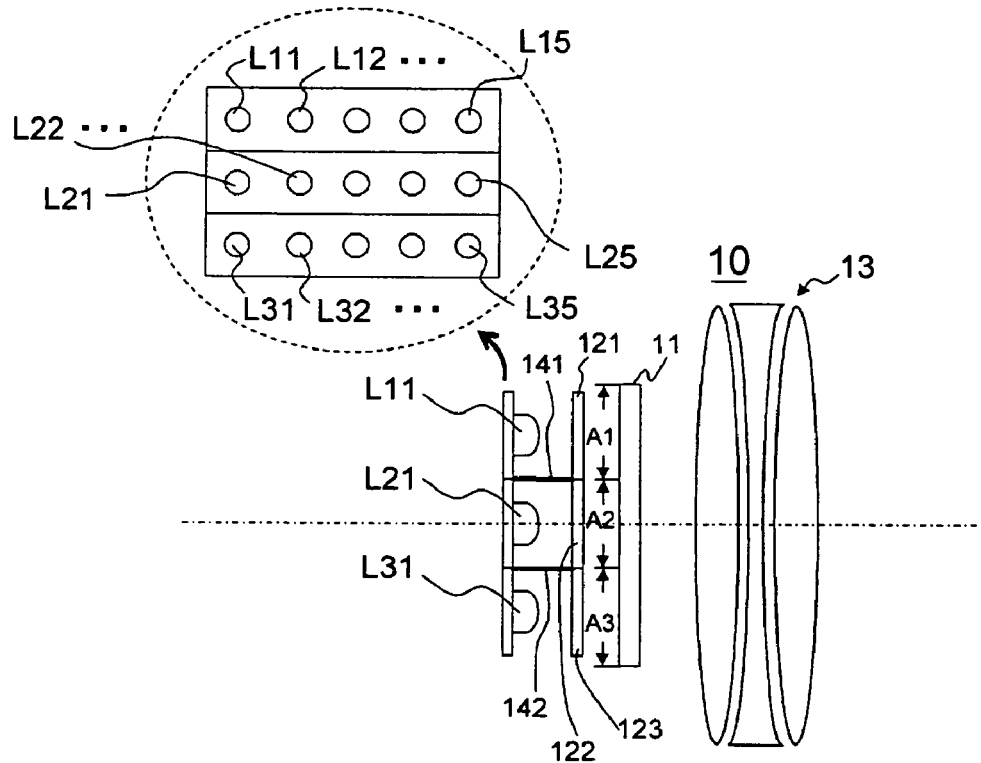
FIG. 5 is a view showing a case where light shielding plates are provided between the solid-state light sources and the diffusing plates.

FIG. 5 is a view showing a case where light shielding plates 141 and 142 are provided between the solid-state light sources L11 through L15, L21 through L25, and L31 through L35 and the diffusing plates 121 through 123. By providing the light shielding plates 141 and 142 as are shown in FIG. 5, lights from the solid-state light sources L11 through L15, L21 through L25, and L31 through L35 corresponding, respectively, to the regions A1, A2, and A3 are allowed to go incident on the corresponding diffusing plates alone. This enables the corresponding regions A1, A2, and A3 of the liquid crystal device 11 to be irradiated at high accuracy.

Holographic diffusers may be used as the diffusing plates 121, 122, and 123. By using the holographic diffusers, more homogeneous illuminance can be achieved. Also, shaped projection in an elliptical shape closer to an oblong is enabled.

Figure 6A:
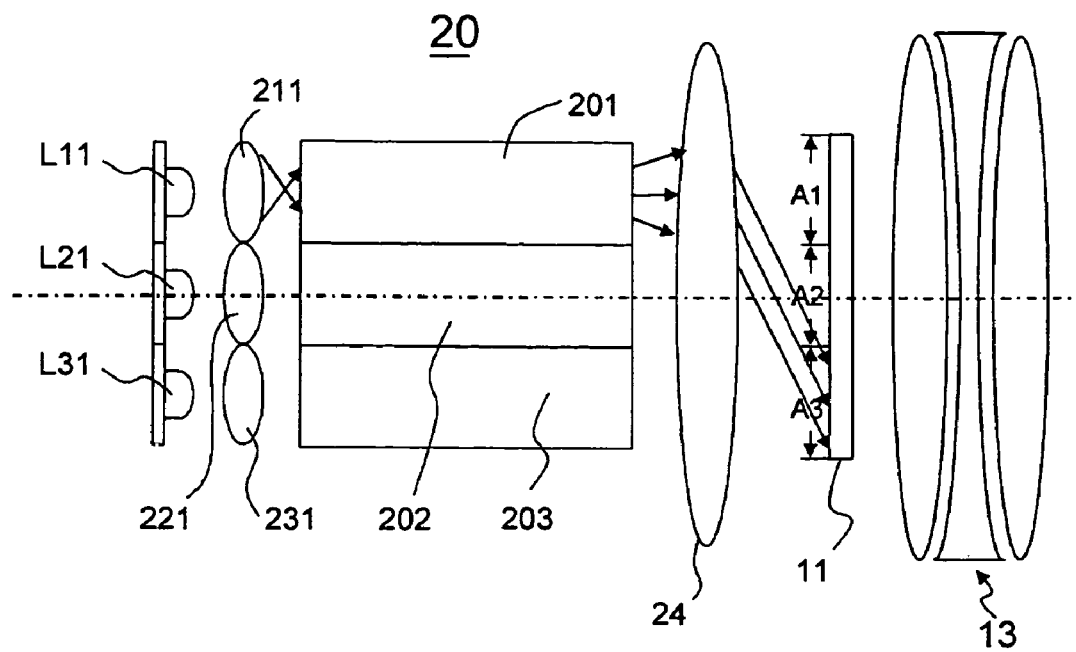
FIGS. 6A and 6B are views schematically showing an optical system of a projector according to a second exemplary embodiment of the invention.
Figure 6B:
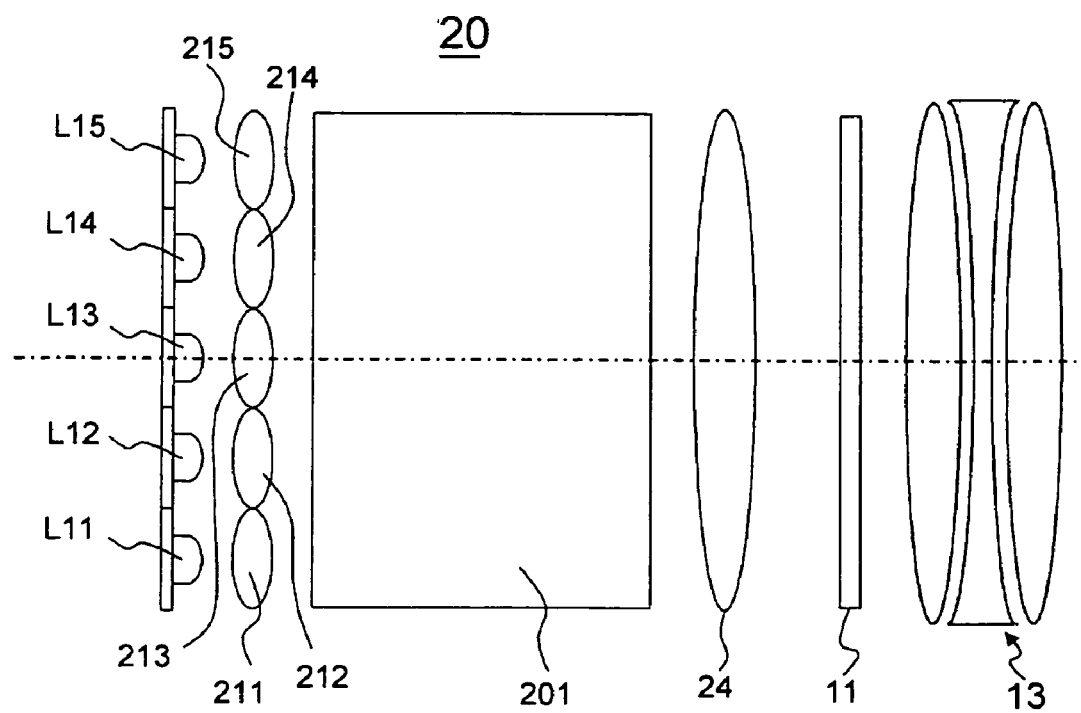

FIGS. 6A and 6B are views schematically showing an optical system in a projector according to a second exemplary embodiment of the invention. FIG. 6A is a side view and FIG. 6B is a plan view. Components that need not be described in the second exemplary embodiment are omitted from these drawings.

A projector 20 of the second exemplary embodiment shown in FIGS. 6A and 6B is different from the projector 10 of the first embodiment in that rod integrators 201, 202, and 203 are used instead of the diffusing plates 121, 122, and 123 used in the first embodiment. Like components are labeled with like reference numerals with respect to FIGS. 1A and 1B.

The rod integrator 201 is provided between the solid-state light sources L11 through L15 and the region A1 of the liquid crystal device 11. The rod integrator 202 is provided between the solid-state light sources L21 through L25 and the region A2 of the liquid crystal device 11. The rod integrator 203 is provided between the solid-state light sources L31 through L35 and the region A3 of the liquid crystal device 11.

In the projector 20 of the second exemplary embodiment, as is shown in FIGS. 6A and 6B, collective lenses 211 through 215, 221 through 225, 231 through 235 (collective lenses 221 through 225 and 231 through 235 are not shown) are provided on the light incident side of the rod integrators 201, 202, and 203 to correspond to the solid-state light sources L11 through L15, L21 through L25, and L31 through L35, respectively. A single collective lens 24 is provided on the light exiting side of the respective rod integrators 201, 202, and 203. The rod integrators 201, 202, and 203 can be those made of glass or hollow rod integrators with the inner surfaces being covered with a reflection film.

By providing the rod integrators 201, 202, and 203, respectively, between the solid-state light sources L11 through L15, L21 through L25, and L31 through L35 and the regions A1, A2, and A3 of the liquid crystal device 11, lights from the respective solid-state light sources L11 through L15 are forced to go incident on the rod integrator 201 by means of the corresponding collective lenses 211 through 215. The lights then pass through the rod integrator 201, after which the lights are irradiated to the region A3 of the liquid crystal device 11 by means of the collective lens 24.

Lights from the solid-state light sources L21 through L25 are forced to go incident on the rod integrator 202 by means of the corresponding collective lenses 221 through 225. The lights then pass through the rod integrator 202, after which the lights are irradiated to the region A2 of the liquid crystal device 11 by means of the collective lens 24. Lights from the solid-state light sources L31 through L35 are forced to go incident on the rod integrator 203 by the corresponding collective lenses 231 through 235. The lights then pass through the rod integrator 203, after which the lights are irradiated to the region A1 of the liquid crystal device 11 by means of the collective lens 24.

In the second exemplary embodiment, too, the lighting control on the solid-state light sources L11 through L15, L21 through L25, and L31 through L35 to prevent a display of a blurred tailed-image can be achieved in the same manner as the first embodiment as the projector control portion 1 shown in FIG. 2 operates as are shown in (a) through (g) in FIG. 3 all used to describe the first exemplary embodiment above. The description, therefore, is not repeated herein.

In the second exemplary embodiment, due to the presence of the collective lens 24, lights from the solid-state light sources L11 through L15 that exit from the rod integrator 201 are irradiated to the region A3 of the liquid crystal device 11, lights from the solid-state light sources L21 through L25 that exit from the rod integrator 202 are irradiated to the region A2 of the liquid crystal device 11, and lights from the solid-state light sources L31 through L35 that exit from the rod integrator 203 are irradiated to the region A1 of the liquid crystal device 11. Hence, in order to perform a display in order of the regions A1, A2, and A3 of the liquid crystal device 11, the solid-state light sources L31 through L35, L21 through L25, and L11 through L15 are lit in this order.

According to the second exemplary embodiment, it goes without saying that a display of a blurred tailed-image can be prevented as with the first exemplary embodiment. Also, it is possible to further enhance homogeneity of illuminance within the respective regions A1, A2, and A3 of the liquid crystal device 11 by providing the rod integrators 201, 202, and 203 between the solid-state light sources L11 through L15, L21 through L25, and L31 through L35 and the regions A1, A2, and A3, respectively.

In order to further enhance homogeneity of illuminance, as with the projector 10 of the first exemplary embodiment, it is preferable for the projector 20 of the second exemplary embodiment to take the measures (A) through (C) described in the projector 10 of the first exemplary embodiment.

In the projector 20 of the second exemplary embodiment, illuminance within the respective regions A1, A2, and A3 is more homogeneous due to the use of the rod integrators 201, 202, and 203. Hence, by taking the measure (B) described in the first exemplary embodiment, higher homogeneity is thought to be achieved in the second exemplary embodiment due to the use of the rod integrators. However, in order to further enhance homogeneity of illuminance, each of the rod integrators corresponding to the regions A1, A2, and A3 may comprise plural rod integrators as is shown in FIG. 7.

Figure 7:
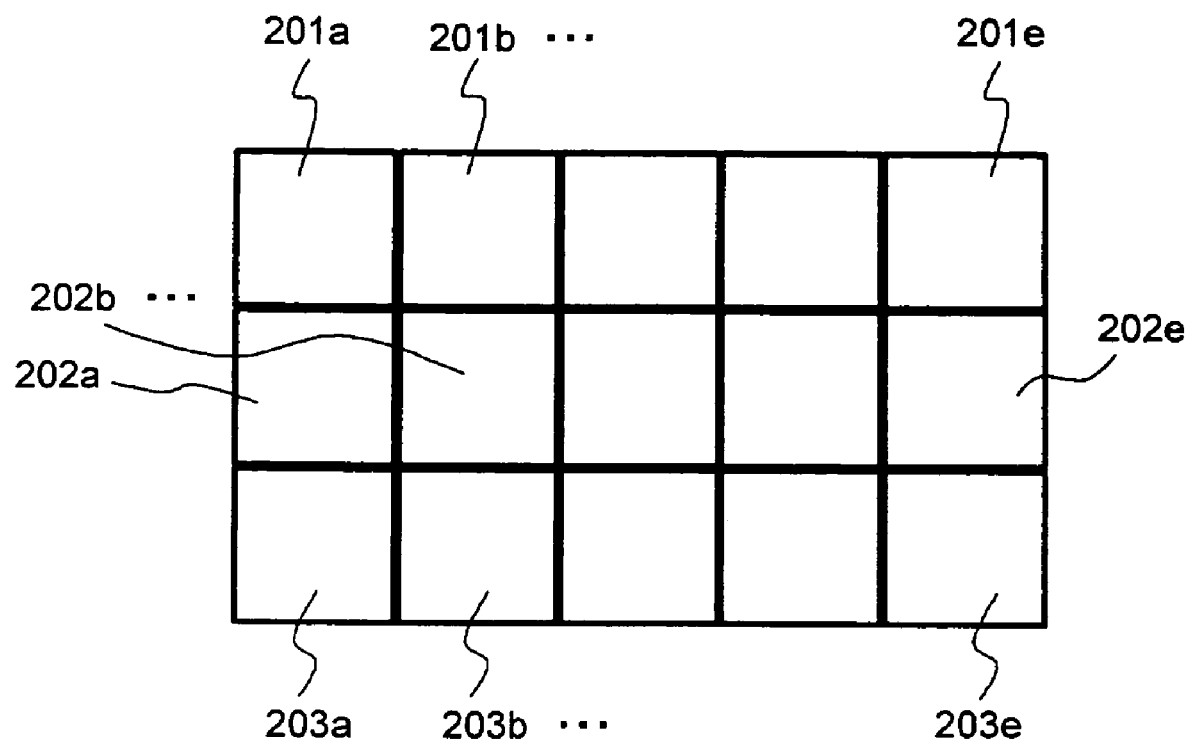
FIG. 7 is a cross section when each of rod integrators corresponding to the respective regions can include plural rod integrators aligned in line.

FIG. 7 is a cross section when each of the rod integrators corresponding to the regions A1, A2, and A3 comprises plural rod integrators aligned in line. Referring to FIG. 7, rod integrators corresponding to the region A1 are denoted by rod integrators 201a, 201b, . . . , and 201e, rod integrators corresponding to the region A2 are denoted by rod integrators 202a, 202b, . . . , and 202e, and rod integrators corresponding to the region A3 are denoted by rod integrators 203a, 203b, . . . , and 203e.

FIG. 7 shows a case where rod integrators corresponding to the respective regions A1, A2, and A3 are provided in the matching number with the solid-state light sources L11 through L15, L21 through L25, and L31 through L35 (five in the horizontal direction and three in the vertical direction) provided for the respective regions A1, A2, and A3, so that they have a one-to-one correspondence.

As can be understood from FIG. 7, each of the rod integrators 201a, 201b, 201c, and so forth has a square cross section or a cross section of a shape close to a square, and these rod integrators 201a, 201b, 201c, and so forth are aligned in the horizontal direction within the respective regions A1, A2, and A3.

By configuring the rod integrators corresponding to the respective regions A1, A2, and A3 as shown in FIG. 7, it is possible to further enhance homogeneity of illuminance within the respective regions A1, A2, and A3, which can in turn lessen illuminance irregularities between illuminance at and in the vicinity of the center and illuminance on and in the vicinity of the edges of the respective regions A1, A2, and A3.

FIG. 7 shows a case where the rod integrators 201a, 201b, and 201c, and so forth are provided in the matching number with the solid-state light sources L11 through L15, L21 through L25, and L31 through L35 in a one-to-one correspondence. It should be understood, however, that they are not necessarily in a one-to-one correspondence.

Also, as with the first exemplary embodiment, by using the solid-state light sources L11 through L15, L21 through L25, and L31 through L35 as the light sources, not only can instantaneous lighting ON/OFF operations be achieved, but also illumination with fewer irregularities in illuminance and color can be achieved. When the instantaneous lighting ON/OFF operations are enabled, so is the lighting control at arbitrary timing and high accuracy. Fine-tuned lighting control can be therefore readily achieved.

It should be appreciated that the invention is not limited to the exemplary embodiments above, and the invention can be modified in various manners without deviating from the scope of the invention.

For example, in the first and second exemplary embodiments, the lighting control is performed in such a manner that the solid-state light sources L11 through L15, L21 through L25, and L31 through L35 corresponding, respectively, to the regions A1, A2, and A3 are kept lit in turn for a specific time, that is, while the solid-state light sources corresponding to one region are kept lit, the solid-state light sources corresponding to the other regions remain unlit. However, it should be understood that the invention is not limited to this configuration. For example, it is possible to perform the lighting control in such a manner that only the solid-state light sources corresponding to the region in which data is being written are kept unlit, while the solid-state light sources corresponding to all the other regions are kept lit.

Also, in the first and second exemplary embodiments, five solid-state light sources aligned in line in the horizontal direction are provided to correspond to each region of the liquid crystal device 11. However, it should be understood that the invention is not limited to this configuration, and an arbitrary number of solid-state light sources can be aligned in either the vertical direction or the horizontal direction depending on the size and the shape of the regions.

In the case of rod-like solid-state light sources capable of emitting lights in a two-dimensional direction, as many rod-like solid-state light sources as necessary can be provided as the light sources for each region.

Also, in the first and second exemplary embodiments, for ease of description, a liquid crystal device in the single-plate projector was described as an example. However, by using an LED emitting white lights as the solid-state light source together with color filters, a color display is enabled.

Alternatively, in order to enable a color display, it goes without saying that a three-plate projector using liquid crystal devices for respective colors, including R (red), G (green), and B (blue), can be used. The descriptions of the first and second exemplary embodiments apply to a case where the three-plate projector is adopted.

Figure 8:
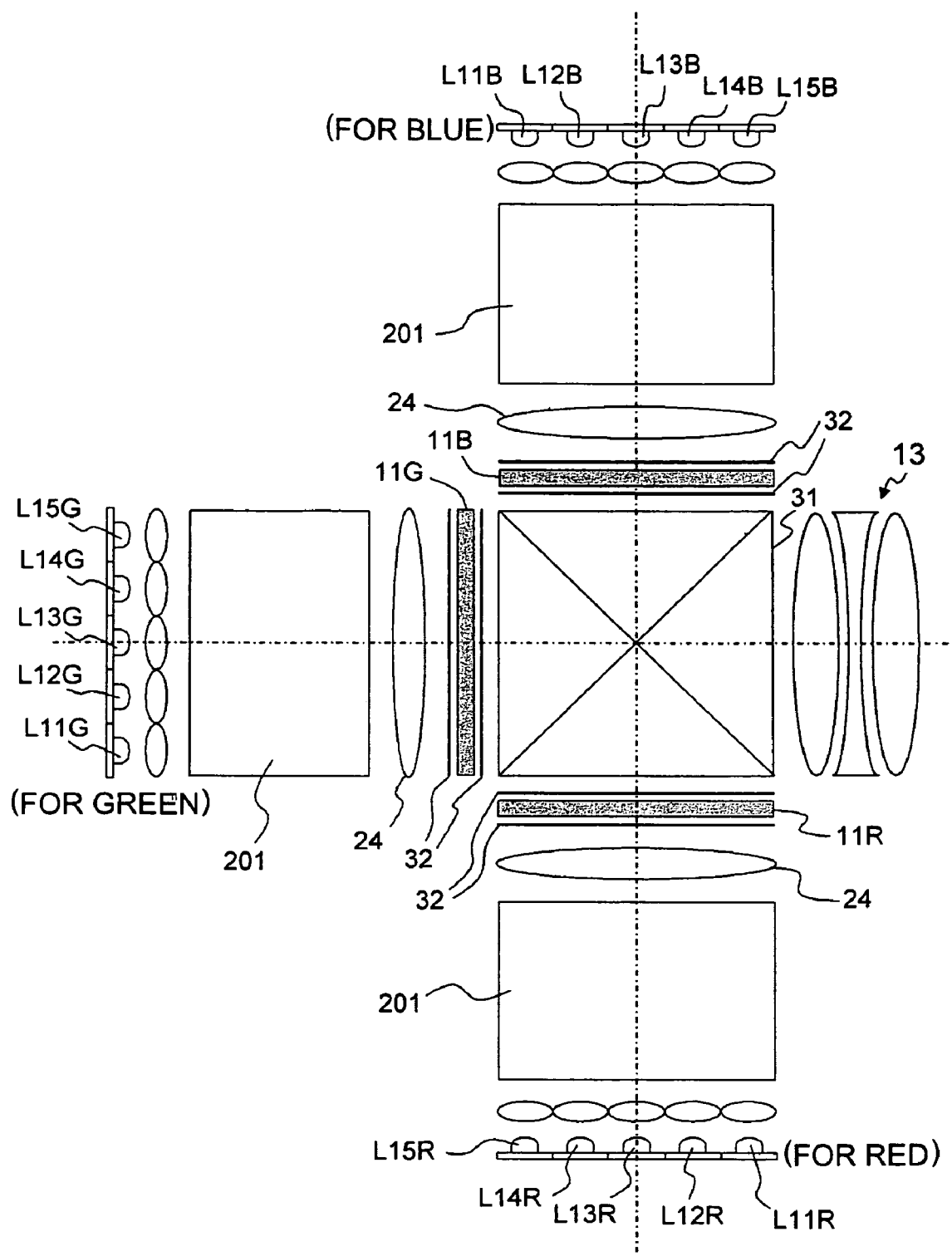
FIG. 8 is a plan view schematically showing an optical system in a three-plate projector.

FIG. 8 is a plan view schematically showing an optical system of a three-plate projector. FIG. 8 shows a configuration when the rod integrators 201, 202, and 203 shown in FIGS. 6A and 6B of the second exemplary embodiment are used. As is shown in FIG. 8, liquid crystal devices 11R for red, 11G for green, and 11B for blue are provided to surround three surfaces of a cross dichroic prism 31.

For each of the liquid crystal devices 11R, 11G, and 11B, the rod integrators 201, 202, and 203 (being the plan view, FIG. 8 shows the rod integrator 201 alone) corresponding, respectively, to the regions A1, A2, and A3 of the respective liquid crystal devices 11R, 11G and 11B are provided, and as solid-state light sources for respective colors, such as LEDs, solid-state light sources for red L11R through L15R, L21R through L25R, and L31R through L35R, solid-state light sources for green L11G through L15G, L21G through L25G, and L31G through L35G, and solid-state light sources for blue L11B through L15B, L21B through L25B, and L31B through L35B are also provided.

Being a plan view, FIG. 8 shows the solid-state light sources L11R through L15R, the solid-state light sources L11G through L15G, and the solid-state light sources L11B through L15B alone. In addition, as with FIGS. 6A and 6B used to describe the second exemplary embodiment, collective lenses 211 through 215, and a collective lens 24 on the liquid crystal device side, a projection lens 13, etc. are provided for each liquid crystal device. Further, although it is not shown in FIGS. 6A and 6B, a polarizer 32 is provided for each liquid crystal device.

Operations as has been described with reference to (a) through (g) in FIG. 3 are possible for the solid-state light sources of the respective colors in the three-plate projector configured as above. Also, by taking the measures (A) through (C) described in the first and second exemplary embodiments, it is possible to further enhance homogeneity of illuminance across all the regions as well as within each region in each of the liquid crystal devices 11R, 11G, and 11B.

The first and second exemplary embodiments have described a case where the panel surface of the liquid crystal device 11 is divided to three regions. It goes without saying, however, that the dividing number is not limited to three.

Also, the first and second exemplary embodiments have described a case where a projector is used as an example of an image display device using an electro-optic modulator having a hold-type display mode. However, the image display device is not limited to a projector, and it can be a direct-view-type image display device, such as a liquid crystal display TV.

While this invention has been described in conjunction with the specific embodiments thereof, it is evident that many alternatives, modifications, and variations will be apparent to those skilled in the art. Accordingly, preferred embodiments of the invention as set forth herein are intended to be illustrative, not limiting. There are changes that may be made without departing from the spirit and scope of the invention.

What is claimed is:

1. An image display device, comprising:
   light sources provided, respectively, for regions obtained by dividing an image forming region of an electro-optic modulator into plural regions to irradiate corresponding regions;
   a light source control portion that performs lighting control on the light sources; and
   the light source control portion performing the lighting control on the light sources for the respective regions independently in sync with writing of image data to the electro-optic modulator, and the lighting control being performed in such a manner that the light source corresponding to at least one region among the plural regions is kept unlit in a writing period for a screenful of image data wherein;
   when the light source for each region includes more than one light source, the light source control portion performing the lighting control on more than one light source to enhance homogeneity of illuminance within each region.

2. The image display device according to claim 1, the light sources being solid-state light sources.

3. The image display device according to claim 1, the lighting control performed in such a manner that the light source corresponding to at least one region among the plural regions is kept unlit being lighting control under which the light sources for the respective regions are kept lit in turn for a specific time.

4. The image display device according to claim 1, the lighting control performed in such a manner that only the light source corresponding to at least one region among the plural regions is kept unlit being lighting control under which, for a region in which the image data is being written, the light source corresponding to the region is lit with a specific time of delay from image data writing timing of the region.

5. The image display device according to claim 1, the light source control portion performing the lighting control on the light sources for the respective regions to enhance homogeneity of illuminance across all the regions.

6. The image display device according to claim 5, the lighting control performed to enhance homogeneity of illuminance across all the regions being lighting control under which illuminance of other regions is matched with illuminance of a region having lower illuminance.

7. The image display device according to claim 1, the lighting control performed to enhance homogeneity of illuminance within each region being lighting control under which illuminance of other portions is matched with illuminance of a portion having lower illuminance within each region.

8. The image display device according to claim 1, further comprising:
   a diffusing plate that is provided between the light source for each region of the electro-optic light modulator and the region.

9. The image display device according to claim 8, the diffusing plate provided for each region having a diffusing capability such that lights from the light source are diffused at different degrees on a surface thereof.

10. The image display device according to claim 9, the diffusing capability being a diffusing capability such that lights from the light source are diffused more at and in the vicinity of a center than on and in the vicinity of an edge of the region.

11. The image display device according to claim 1, further comprising:
    an image data display control portion that is capable of controlling pixel values of the image data; and
    the image data display control portion performing control of the pixel values in such a manner that a difference between illuminance on and in the vicinity of a boundary of each region and illuminance at and in the vicinity of a center of the region is lessened.

12. An image display device, comprising:
    light sources provided, respectively, for regions obtained by dividing an image forming region of an electro-optic modulator into plural regions to irradiate corresponding regions;
    a light source control portion that performs lighting control on the light sources;
    the light source control portion performing the lighting control on the light sources for the respective regions independently in sync with writing of image data to the electro-optic modulator, and the lighting control being performed in such a manner that the light source corresponding to at least one region among the plural regions is kept unlit in a writing period for a screenful of image data;
    a diffusing plate that is provided between the light source for each region of the electro-optic light modulator and the region; and
    a light shielding plate that is provided between the diffusing plate provided for each region and the light source for the region, so that lights from the light sources corresponding to the other regions are shielded.

13. The image display device according to claim 12, the lighting control performed in such a manner that the light source corresponding to at least one region among the plural regions is kept unlit being lighting control under which the light sources for the respective regions are kept lit in turn for a specific time.

14. The image display device according to claim 12, the lighting control performed in such a manner that only the light source corresponding to at least one region among the plural regions is kept unlit being lighting control under which, for a region in which the image data is being written, the light source corresponding to the region is lit with a specific time of delay from image data writing timing of the region.

15. The image display device according to claim 12, further comprising:
    an image data display control portion that is capable of controlling pixel values of the image data; and the image data display control portion performing control of the pixel values in such a manner that a difference between illuminance on and in the vicinity of a boundary of each region and illuminance at and in the vicinity of a center of the region is lessened.

16. An image display device, comprising:

light sources provided, respectively, for regions obtained by dividing an image forming region of an electro-optic modulator into plural regions to irradiate corresponding regions;

a light source control portion that performs lighting control on the light sources;

the light source control portion performing the lighting control on the light sources for the respective regions independently in sync with writing of image data to the electro-optic modulator, and the lighting control being performed in such a manner that the light source corresponding to at least one region among the plural regions is kept unlit in a writing period for a screenful of image data; and a rod integrator that is provided for each region between the light source for each region of the electro-optic modulator and the region.

17. The image display device according to claim 16, the rod integrator for each region including plural rod integrators aligned in line in the region.

18. The image display device according to claim 17, each of the plural rod integrators having at least one of a square cross section and a cross section of a shape close to a square.

19. The image display device according to claim 16, the lighting control performed in such a manner that the light source corresponding to at least one region among the plural regions is kept unlit being lighting control under which the light sources for the respective regions are kept lit in turn for a specific time.

20. The image display device according to claim 16, the lighting control performed in such a manner that only the light source corresponding to at least one region among the plural regions is kept unlit being lighting control under which, for a region in which the image data is being written, the light source corresponding to the region is lit with a specific time of delay from image data writing timing of the region.

* * * * *